July 17, 1934.     O. RASMUSSEN     1,967,065
SYNCHRONIZER FOR TRANSMISSION
Filed March 12, 1932
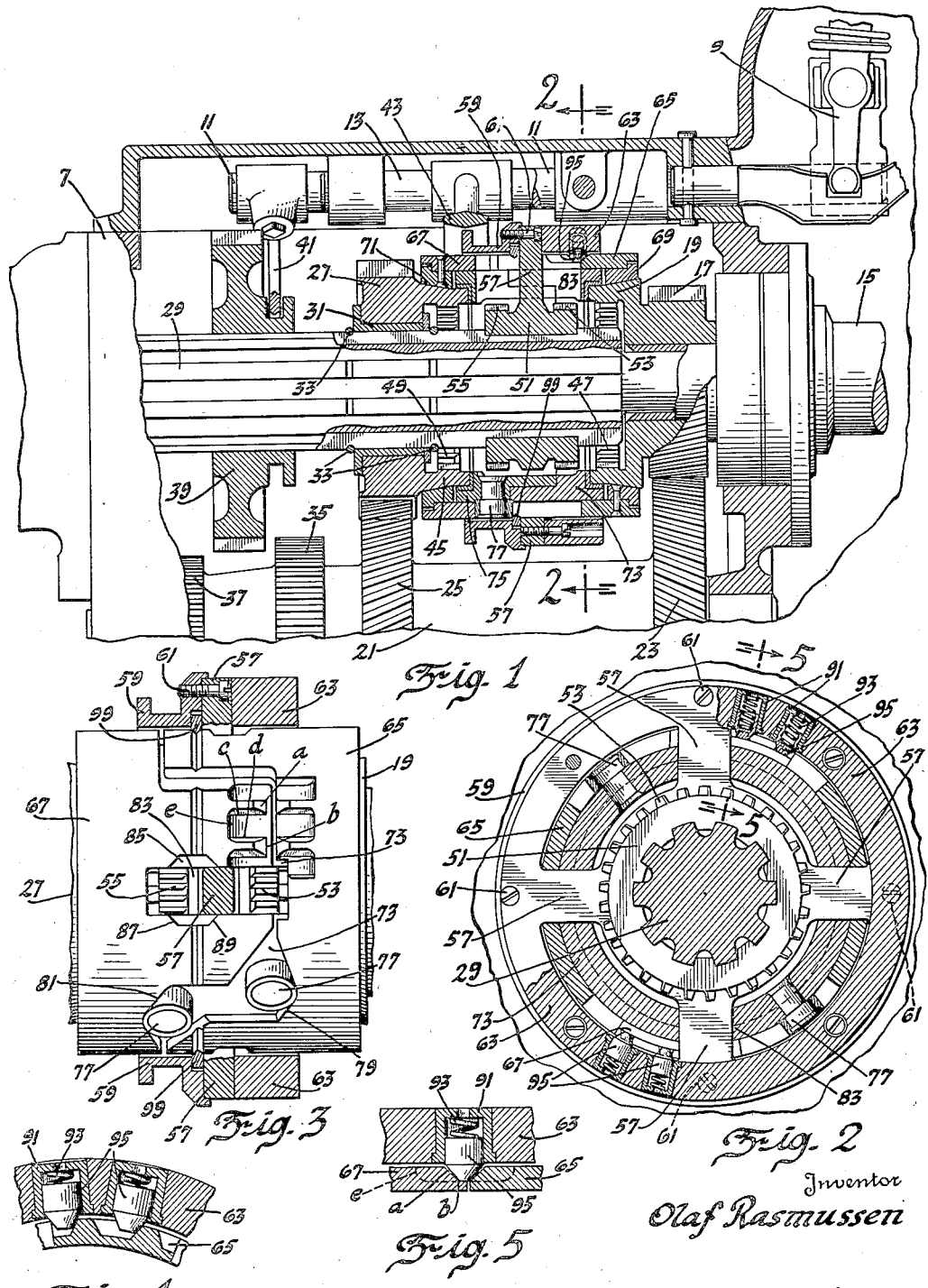
Inventor
Olaf Rasmussen
By Blackmore, Spencer & Flint
Attorneys Patented July 17, 1934

1,967,065

UNITED STATES PATENT OFFICE 1,967,065

SYNCHRONIZER FOR TRANSMISSION

Olaf Rasmussen, Detroit, Mich., assignor to General Motors Corporation, Detroit, Mich., a corporation of Delaware Application March 12, 1932, Serial No. 598,384

5 Claims. (Cl. 192—53)

This invention relates to change speed transmission mechanism and particularly to such a transmission embodying sequential action of friction and jaw clutches to effect quietness in changing gear ratios.

An object of the invention is to make use of an improved energizing mechanism to influence the action of the friction clutch.

Another object is to make use of a novel spring plunger device operable to effect the action of the energizer.

Other objects and advantages will be understood from the following description.

The invention is illustrated in the accompanying drawing in which—

Fig. 1 is a longitudinal vertical section through a change speed transmission embodying my invention.

Fig. 2 is a transverse section on line 2—2 of Fig. 1 with parts broken away.

Fig. 3 is an elevation of the assembled friction drums with the actuating ring shown in section.

Fig. 4 is a section according to Fig. 2 with the friction drums relatively displaced.

Fig. 5 is a section on line 5—5 of Fig. 2.

Referring by reference characters to the drawing, numeral 7 represents a transmission housing through the dome of which is projected a shifting lever 9. Numerals 11 and 13 represent the two shift rods which are reciprocated by the action of the lever 9. At 15 is an input shaft extending through the front wall of the transmission. Within the transmission housing this shaft is provided with a gear 17 and a clutch cone 19. 21 represents the countershaft of the transmission having a gear 23 in constant mesh with gear 17, this gear train driving the countershaft. Numeral 25 represents the second speed driving gear operable to rotate the second speed driven gear 27. This gear 27 is rotatably mounted upon a sleeve 31, the sleeve being retained on the spline shaft 29 by retaining rings 33. 35 and 37 represent low speed and reverse driving gears on the countershaft. Numeral 39 is a gear slidably splined on the driven shaft. This gear is designed to mesh with gear 35 for low speed driving and with an idler (not shown), the idler being driven by gear 37, for driving in reverse. 41 is a fork associated with gear 39 and shift rod 11 for low speed and reverse operations. A fork 43 associated with shift rod 13 is designed to reciprocate operating means for second speed and for high speed driving.

Numeral 45 represents a conical friction surface associated with gear 27. Numerals 47 and 49 represent internal clutch teeth carried by the flanges 19 and 45 constituting parts of gears 17 and 27. A slidable clutch member represented by numeral 51 reciprocates on the spline shaft 29 and is located between the gears 17 and 27. It is provided with clutch teeth 53 and 55, the former to engage teeth 47 and the latter to engage teeth 49. This clutch member is provided with radial arms 57 to the outer ends of which there is secured a collar 59 by fastening means 61. 63 represents a ring member suitably secured in any preferred manner to the extremities of the radial arms 57.

Numerals 65 and 67 represent two friction rings or drums. These drums are provided with friction faces 69 and 71 suitably secured thereto, the friction faces being designed to engage the conical friction members 19 and 45 associated with the gears 17 and 27. The adjacent edges of the friction drums 65 and 67 are shaped substantially as shown in Fig. 3. It will be observed that there is provided a limited relative rotary movement of the two drums. Beneath the friction drums 65 and 67 are energizing rings 73 and 75. These energizing rings are arranged in overlapping relation as shown in Fig. 1, and their remote ends are rotatably supported upon the adjacent cylindrical ends of the flanges associated with the gears 17 and 27. The two energizing rings are provided with radially directed pins 77. As best shown in Fig. 3 these pins project radially between the friction drums 65 and 67 and engage cam surfaces 79 and 81 provided on the said friction drums.

The radial arms 57 of the sliding clutch member project through openings 83 in the energizing rings, the width of this opening corresponding to the width of the arm 57 so that there is no relative rotary movement between the clutch member 51 and the energizing rings 73 and 75. The radial arms 57 also extend through recesses or openings in the friction drums 65 and 67. In the case of each of the members 65 and 67 the recess receiving the arm 57 has a narrow part corresponding in dimensions with the thickness of the arm 57 on either side of a wider part represented by numeral 85. When the sliding clutch member 51 is positioned at either end of the narrower part of the recess of the friction drums there is no relative movement therebetween. When, however, it is in the region of the wider part of the recess relative movement may occur. It will be seen further that the walls where the narrow part merges into the wider part are inclined. This is illustrated by numerals 87, 89. Around the periphery of the friction drums 65 and 67 and on their adjacent edges the following construction is adopted. From a point $a$ upon the upper surface of the drum an inclined wall slopes down to a point $b$ near the edge of the drum. From the point $b$ to the edge of the drum the upper wall is parallel to the lower wall of the drum. The region having this construction has a width represented by letters $c$, $d$. Circumferentially beyond $c$ and $d$ the walls slope down to a plane corresponding to the flat portion between point $b$ and the edge of the drum. From this lower plane a wall $e$ slopes upwardly to the upper surface of the drum. There are several of such formations around the periphery of the drum. Within the member 63 opposite these formations there is inserted a spring retainer 91 within which is a spring 93 engaging a plunger 95. When the parts are in their normal position the tip of this plunger engages the flat surface of the drum between $b$ and its edge as shown in Fig. 5. It will be obvious that if the member 63 carrying the spring plunger should slide axially relative to either drum the plunger 95 would move up the inclined surface from $b$ to $a$ against the resistance of its spring 93. When once upon the higher surface it will also be obvious that if there be any relative rotary movement of the part 63 and the drum the conical ended plunger 95 would slide down one of the inclined faces, and that this sliding movement would have a tendency to rotate the drum, assuming the ring 63 to be held from such rotation.

While perhaps not absolutely essential it may be preferred to use a spring ring 99 located within the collar 59 and engaging the outer walls of the members 65 and 67, this spring ring being intended to move the two drums together toward one of the friction cones associated with the gears, and away from the other cone.

The operation of the construction described above is substantially as follows: When the lever 9 is rocked to reciprocate the collar 59 by means of the fork 43 it slides the jaw clutch member 51 either toward the gear 17 or toward the gear 27. Since the operation of the novel mechanism is substantially the same in whichever direction this action occurs, it will be sufficient for the purpose of this description to assume that the clutch member 51 is moved to the left with the intent of engaging teeth 55 with teeth 49. When this movement is first started the two friction drums 65 and 67 are moved along with the clutch member 51, this through the instrumentality of the spring ring 99. The engagement of the spring plunger 95 against the inclined wall between points $a$ and $b$ may be sufficient also to start the movement of the friction drum toward the frictional cone on the gear 27. If, as may be assumed to be the case, the gear 27 is rotating at a rate differing from that of the shaft 29 and the clutch member 51, the engagement of the friction ring 71 carried by the drum 67 will cause a relative movement between the drum 67 and the clutch member 51 as soon as the radial arm 57 has moved into the region of the wider space 85. It is permitted to so move since the friction drum 67 has been stopped by its engagement with the cone on gear 27. The relative movement thus started will be limited by the engagement of the radial arm 57 with one of the angular faces between the wide and the narrow part of the opening in the friction drum. This engagement is sufficient to prevent the completion of the movement of the movable jaw clutch member into clutch engagement with teeth 49 until the friction between the drum and cone has synchronized the rate of rotation of the gear 27 and the shaft 29. It will be remembered that the energizing ring 75 carries the pin 77 engaging the cam face 81 on the friction drum. The rotation of the drum 67 causes the pin to engage the cam faces and tend to thrust the friction member more firmly into contact with the cone on the gear. This function of effecting firm frictional contact may be assured by the action of the spring plunger 95. When the clutch member 51 is first moved it carries the ring 63 with it and as a result of the relative axial movement between clutch member 51 and friction drum 67 the plunger 95 is forced to slide up the inclined wall from $b$ to $a$ and rest upon the upper surface of the drum. Then the limited rotary movement of the drum 67 relative to the clutch member 51 carries the plunger over and onto the sloping side wall on one side or the other of the ridge. The action of the plunger under the influence of its spring 93 upon the sloping wall tends to carry the drum around in the same direction that it has already started to turn. This influence, tending to rotate the friction drum 67, obviously forces the cam surface against the pin of the energizing ring and there is assured a firm contact between the friction surfaces 71 and 45. It may be noted also that when the parts are returned to neutral position the surface 89 ensures the release of the energizing means and thereby facilitates the disconnection of the clutch drum member from the cone.

I claim:

1. In combination with driving and driven members, a jaw clutch to connect said members, a frictional synchronizing means to effect equalized rotation of said members prior to the engagement of said clutch, energizing means therefor, and auxiliary mechanism operable upon said energizing means to render it additionally effective upon said synchronizing means.

2. In combination with a frictional synchronizing means, energizing means therefor, an auxiliary mechanism operable upon said energizing means to render it effective upon said synchronizing means, said auxiliary mechanism comprising relatively rotatable parts, a spring plunger carried by one of said parts and inclined surfaces upon said other part whereby relative rotary motion between said parts is effected.

3. In combination with sequentially operable friction and jaw clutches in which one element of each of said clutches is movable, said movable clutch members constructed to have relative axial movement and relative limited rotary movement, detent faces between said movable clutch elements to prevent jaw tooth engagement prior to synchronization by the action of the friction clutch, energizing means comprising cam faces on said movable friction clutch member and a part engageable therewith and non-rotatable relative to the movable jaw clutch element to effect friction clutch engagement, and auxiliary means to render the energizing means additionally effective upon the synchronizing means.

4. In combination with sequentially operable friction and jaw clutches in which one element of each of said clutches is movable, said movable clutch members constructed to have relative axial movement and relative limited rotary movement, detent faces between said movable clutch elements to prevent jaw tooth engagement prior to synchronization by the action of the friction clutch, energizing means comprising cam faces on said movable friction clutch member and a part engageable therewith and non-rotatable relative to the movable jaw clutch element to effect friction clutch engagement, and auxiliary means to effect the operation of the energizing means, said auxiliary means comprising sloping faces on the movable friction clutch member and a spring plunger movable with the jaw clutch member along said faces upon the relative rotary movement of the movable clutch members to effect the operation of the energizing means.

5. In combination, a combined friction and jaw clutch element, a movable friction clutch element, a movable jaw clutch element, said movable clutch elements having both relative axial and limited relative rotary movements, an energizing member having radial pins, said energizing member and movable jaw clutch member having relative axial movement but being relatively non-rotatable, said energizing member and the movable friction clutch member having slight relative axial movement and slight relative rotary movement, said movable friction clutch element having cam slots engaging said pins to produce axial movement of the movable friction clutch element, said movable friction clutch movement having axially inclined walls and circumferentially inclined walls, said movable jaw clutch element having a spring detent slidable up said axially inclined walls and then down said circumferentially inclined walls to render said energizing means operable upon said friction clutch.

OLAF RASMUSSEN.